US011997770B2

(12) United States Patent
Zou et al.

(10) Patent No.: US 11,997,770 B2
(45) Date of Patent: May 28, 2024

(54) MECHANISM FOR CONTROLLING A DRIVER ARRANGEMENT

(71) Applicant: SIGNIFY HOLDING B.V., Eindhoven (NL)

(72) Inventors: Rui Zou, Shanghai (CN); Yuanqiang Liu, Shanghai (CN); Qingxue Wang, Shanghai (CN); Mo Shen, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/793,570

(22) PCT Filed: Sep. 10, 2021

(86) PCT No.: PCT/EP2021/074957
§ 371 (c)(1),
(2) Date: Jul. 18, 2022

(87) PCT Pub. No.: WO2022/058245
PCT Pub. Date: Mar. 24, 2022

(65) Prior Publication Data

US 2023/0209675 A1 Jun. 29, 2023

(30) Foreign Application Priority Data

Sep. 18, 2020 (WO) ................ PCT/CN2020/116205
Dec. 21, 2020 (EP) .................................... 20216161

(51) Int. Cl.
*H05B 45/325* (2020.01)

(52) U.S. Cl.
CPC .................................. *H05B 45/325* (2020.01)

(58) Field of Classification Search
CPC ...... H05B 45/10; H05B 45/30; H05B 45/325; H05B 47/10
See application file for complete search history.

(56) References Cited

U.S. PATENT DOCUMENTS

| | | | | |
|---|---|---|---|---|
| 2014/0306530 | A1 | 10/2014 | Theiler | |
| 2015/0022121 | A1 * | 1/2015 | Meng .................. | H05B 45/395 315/311 |
| 2016/0192449 | A1 | 6/2016 | Murakami et al. | |
| 2019/0090321 | A1 | 3/2019 | Lee et al. | |

FOREIGN PATENT DOCUMENTS

| | | |
|---|---|---|
| CN | 108012365 A | 5/2018 |
| JP | 2012049184 A | 3/2012 |

* cited by examiner

*Primary Examiner* — Jimmy T Vu

(57) ABSTRACT

A driver arrangement for a lighting unit. The drive arrangement comprises an independent first driver mainly for driving a first output capacitor and an independent second driver configured to mainly driving the second output capacitor. The driver arrangement is configured to allow an independent first driver to charge the second output capacitor when one or more predetermined criteria are met.

15 Claims, 4 Drawing Sheets

MECHANISM FOR CONTROLLING A DRIVER ARRANGEMENT

CROSS-REFERENCE TO PRIOR APPLICATIONS

This application is the U.S. National Phase application under 35 U.S.C. § 371 of International Application No. PCT/PCT/EP2021/074957, filed on Sep. 10, 2021, which claims the benefits of European Patent Application No. 20216161.8, filed on Dec. 21, 2020 and Chinese Patent Application No. PCT/CN2020/116205 filed on Sep. 18, 2020. These applications are hereby incorporated by reference herein.

FIELD OF THE INVENTION

The present invention relates to driver arrangements for lighting units, and in particular to the driver arrangements having two independently controlled drivers.

BACKGROUND OF THE INVENTION

Lighting units employ driver arrangement to power one or more lighting modules, e.g. an LED module. Typically, a drive arrangement provides power to charge one or more output or storage capacitor, from which the lighting module(s) then draws power. Some lighting units have two (or more) separate lighting modules, each of which draws power from a separate, dedicated output capacitor. Different drivers may be used to charge each capacitor, so that each output capacitor is charged by a different driver. Effectively, this results in different lighting modules being powered (via a respective output capacitor) by different drivers.

In this way, a driver arrangement for a lighting unit may have two (or more) independently controlled drivers for charging separate capacitors, each of which provides power for different lighting modules.

The independent controlled drivers may also be configured to control the current flowing through the lighting module that draws power from the output capacitor charged by the driver. This enables light of different colors, temperatures and/or patterns to be output by the overall lighting unit.

The use of separate drivers for different LEDs/lighting module is advantageous, as it provides more accurate current control/driving of the respective lighting module, supports higher power, amongst other benefits.

There is an ongoing desire to improve the consistency and uniformity of light output by a lighting unit.

SUMMARY OF THE INVENTION

A problem of the previously described topology is that the charging rate of the output capacitors may be quite different, if the two drivers are set with too different output power/currents respectively. This results a time lag between the two output capacitors reaching the turn on voltage of the different lighting module (e.g. LED module), causing a color or brightness shift over time. For instance, for a period of time after the overall lighting system is switched on, the driver with higher output current will light up a first color LED while the driver with less output current will light up a second color LED much later, the color and brightness of the overall lighting system will not be uniform overtime and there may be a visible color change. US20160192449A1 and CN108012365A discloses the topology of two separate drivers to drive two separate LEDs, and they propose certain solutions to shorten the delay between the turning on of the separate LEDs.

The invention is defined by the claims.

According to examples in accordance with an aspect of the invention, there is provided a driver arrangement comprising: a first driver and a first output capacitor, wherein the first driver is configured to provide power for charging the first output capacitor; a second driver and a second output capacitor, wherein said second driver is configured to provide power for charging the second output capacitor; a control unit configured to control an operation of the first driver and to control an operation of the second driver independently of the first driver; and a first electronic path coupled between the first driver and the second output capacitor, wherein the first electronic path is configured to allow the first driver, in response to one or more first predetermined criteria being met, to also charge the second output capacitor.

The present disclosure recognizes that the operation of different drivers can result in different charging rates (e.g. during start-up) for output capacitors of an overall drive arrangement. For instance, in the context of lighting units in which different lighting modules draw power from different output capacitors (and the current through the lighting modules is also controlled by the driver that charges the output capacitor), the charging rate of the capacitor (charged by a particular driver) is affected by the current provided by said particular driver.

For lighting units, this can result in different lighting modules that draw power from different output capacitors beginning to emit light at different times, as the output capacitors become sufficiently charged for powering the respective lighting modules at different times. This results in the light characteristics changing during start-up The present disclosure proposes to alleviate this difference in charging rates by allowing the first driver to charge the second output capacitor when a certain criterion or certain criteria are met. This is the most distinctive technical feature from the above-mentioned prior arts which does not disclose or inspire using one driver to charge an output capacitor of another driver.

In one embodiment, the driver arrangement comprises a first arrangement to determine whether the one or more first predetermined criteria being met. This embodiment explicitly defines a physical component to implement the determination.

The first predetermined criteria may include any criteria that indicates a charging rate of the second capacitor is less than a charging rate of the first capacitor by more than a predetermined amount, or any criteria that indicates that the second driver is charging the second output capacitor below a target charging rate.

The first predetermined criteria may include one or more of: a criterion that the charging rate of the first output capacitor is greater than a charging rate of the second output capacitor by at least a predetermined amount; a voltage across the first output capacitor is greater than a voltage across the second output capacitor by at least a predetermined amount; and/or a current provided by the first driver to the first output capacitor is greater than the current provided by the second driver to the second output capacitor by at least a predetermined amount. Other suitable criteria will be apparent to the skilled person.

In some embodiments, the one or more first predetermined criteria includes a first criterion that the difference between the voltage across the first output capacitor and the voltage across the second output capacitor reaches or exceeds a first predetermined value, and the first electronic path is configured to allow the first driver to charge the second output capacitor to follow the charging and voltage of the first output capacitor.

This approach means that if the charging of the second output capacitor lags behind the charging of the first output capacitor, the first electronic path will permit the first driver to charge the second output capacitor, so that the charging rates for both output capacitors are similar or substantially the same.

Optionally, the first electronic path comprises a voltage trigger arrangement connected between the first output capacitor and the second output capacitor, wherein the voltage trigger arrangement is adapted to, in response to a difference between the voltage across the first output capacitor and the voltage across the second output capacitor reaching or exceeding the first predetermined value, become conductive and permit the first driver to charge the second output capacitor.

This embodiment provides a relatively simple/low cost, but reliable, implementation as a voltage trigger arrangement is usually low cost and reliable in its triggering voltage.

The voltage trigger arrangement may also be adapted to provide a clamping voltage.

An advantage of this embodiment is that the clamping voltage makes the voltage on the second output capacitor follow the voltage on the first output capacitor, and is quite stable, and can be provided at a low cost. Furthermore, many voltage trigger arrangements, such as a Zener diode, inherently have a voltage clamp function, thus re-using the same component can achieve double function of voltage triggering and voltage clamping.

In a further embodiment, the clamping voltage is selected such that a voltage across the second output capacitor that results from charging by the first driver and is thereby equal to the voltage across the first output capacitor minus the clamping voltage, is less than a forward voltage of a load that draws power from the second output capacitor.

The load that draws power from the first output capacitor may be a first lighting module, e.g. comprising one or more LEDs. The load that draws power from the second output capacitor may be a second lighting module, e.g. comprising one or more LEDs. This prevents the first driver charging the second output capacitor to the turn on voltage of the second LED load, and reduces the likelihood that that the first driver will unintentionally turn on the second LED load which would result in the second LED load not being controlled by the second driver.

In some examples, the voltage trigger arrangement comprises: a Zener diode with a reverse break down voltage of between 2.7V to 15V and connected from the first output capacitor to the second output capacitor, the Zener diode being adapted to use the reverse break down voltage substantially as the clamping voltage, and a block diode connected from the second output capacitor to the first output capacitor to prevent a forward conduction of the Zener diode.

The voltage trigger arrangement may further comprise a diode connected in series with the Zener diode, wherein the cathodes of the diode and the Zener diode are directly connected to one another or wherein the anodes of the diode and the Zener diode are directly connected to one another. Preferably, the sum of the Zener voltage of the Zener diode and the forward voltage of the diode is equal to the first predetermined value.

When the difference between the voltage across the first output capacitor ($V_{C1}$) and the voltage across the second output capacitor ($V_{C2}$), exceeds the sum of the reverse breakdown voltage ($V_z$) and the forward voltage of the block diode ($V_D$), i.e. VC1−Vc2>Vz+Vd, then the Zener diode and block diode become conductive. After this, Vc2=Vc1−Vz−Vd. If the second driver increases the voltage across the second output capacitor after this point, then the electronic path becomes unconductive once again.

The voltage trigger arrangement is adapted to become non-conductive in response to the voltage across the two output capacitors becoming sufficient to power respective loads that draw power therefrom.

Thus, the first conduction path is configured so that, once the first and second output capacitors have been sufficiently charged, the voltage difference of the first and the second output capacitor is so little that it makes the voltage triggering component become non-conductive once again.

Making the voltage triggering component non-conductive once again can reduce or avoid cross-channel interference during subsequent operation of the driver arrangement (e.g. when driving loads).

In some examples, the first electronic path comprises circuitry connected between the cathodes of the first and second output capacitors, with the anodes of the first and second output capacitors being directly connected.

In other examples, the first electronic path comprises circuitry connected between the anodes of the first and second output capacitors, with the cathodes of the first and second output capacitors being directly connected.

Those two examples give concise implementations of the first electronic path.

Some embodiments further comprise: a second electronic path coupled between the second driver and the first output capacitor, wherein the second electronic path is configured to allow the second driver, in response to one or more second predetermined criteria being met, to also charge the first output capacitor.

This embodiment gives a counterpart electronic path that handles the second driver's overpower on the first driver, with respect to the first electronic path that handles the first driver's overpower on the second driver as discussed above. The second predetermined criteria may include one or more of: a criterion that the charging rate of the second output capacitor is greater than a charging rate of the first output capacitor by at least a predetermined amount; a voltage across the second output capacitor is greater than a voltage across the first output capacitor by at least a predetermined amount; and/or a current provided by the second driver to the second output capacitor is greater than the current provided by the first driver to the first output capacitor by at least a predetermined amount.

In a further embodiment, the driver arrangement comprises a second arrangement to determine whether the second predetermined criteria being met. The one or more second predetermined criteria may include a second criterion that the difference between the voltage across the second output capacitor and the voltage across the first output capacitor reaches or exceeds a second predetermined value.

The second predetermined value may be equal to the first predetermined value. However, other approaches for selecting the second predetermined value are also envisaged. For instance, the second predetermined value may be selected such that a voltage across the first output capacitor, due to charging by the second driver, is less than a forward voltage of a load that draws power from the first output capacitor when the voltage across the second output capacitor reaches a forward voltage of a load that draws power from the second output capacitor.

The second electronic path may comprise circuitry connected between the cathodes of the first and second output capacitors, with the anodes of the first and second output capacitors being connected.

In other examples, the second electronic path comprises circuitry connected between the anodes of the first and second output capacitors, with the cathodes of the first and second output capacitors being directly connected.

In further embodiment, the second electronic path comprises a voltage trigger arrangement connected between the second output capacitor and the first output capacitor, wherein the voltage trigger arrangement is adapted to, in response to a difference between the voltage across the second output capacitor and the voltage across the first output capacitor reaching or exceeding the second predetermined value, become conductive and permit the second driver to charge the first output capacitor.

The one or more first predetermined criteria may include a certain criterion that the difference between an output current of the first driver and an output current of the second driver reaches or exceeds a predetermined value.

Those two examples give concise implementations of the second electronic path.

In some examples, the driver arrangement comprises a switch controller, the first electronic path comprises an actively controlled switch to allow a current from the first driver to also charge the second output capacitor.

This implementation can operate like a feedforward control that proactively senses that the first driver's output current already being much higher than the second driver's output current, and can activate the switch at the very beginning (i.e. just as the first output capacitor begins to charge). This implementation could make the first driver being charging the second output capacitor as early as possible until the voltage difference is built. This approach could further increase the speed of the startup process.

The controlled switch may be operated by the switch controller in a linear state, wherein a voltage drop across the controlled switch is selected such that the voltage across the second output capacitor that results from charging by the first driver and is thereby equal to the voltage across the first output capacitor minus the voltage drop across the controlled switch, is less than a forward voltage of a load that draws power from the second output capacitor.

Again, like the clamping voltage provided by the voltage triggering component as discussed above, the switch can also provide a voltage drop to prevent the first driver charging the second output capacitor to a turn on voltage and mis-controlling the second load.

The controlled switch may be operated by the switch controller to become non-conductive in response to the voltage across the first output capacitor and the voltage across the second output capacitor becoming sufficient to power respective loads that draw power therefrom.

Again, this avoids interference of each driver to the other output capacitor/load during normal operation.

The first driver may comprise a first current source configured to control a current supplied through a first output in parallel with the first output capacitor. The second driver nay comprise a second current source configured to control a current supplied through a second output in parallel with the second output capacitor.

Alternatively, the first driver and the second driver can also be voltage sources, or one could be a current source with the other being a voltage source.

There is also proposed a lighting unit comprising: a driver arrangement herein described; a first lighting module configured to draw power from the first output capacitor, wherein the current through the first lighting module is controlled by the first driver; and a second, different lighting module configured to draw power from the second output capacitor, wherein the current through the second lighting module is controlled by the second driver.

The first lighting module may comprise one or more LEDs, and the second lighting module may comprise one or more LEDs.

In a further embodiment, the control unit configured to control the operation of the first driver and the second driver using a pulse width modulation control technique.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
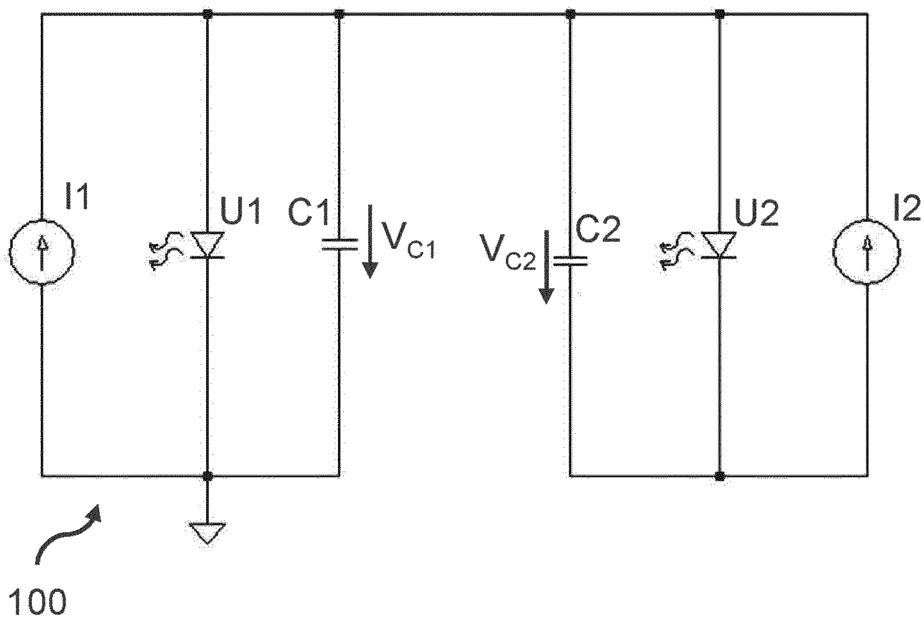
FIG. 1 illustrates a driver arrangement.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a driver arrangement for a lighting unit. The driver arrangement is configured to allow a first driver, for driving a first output capacitor, to charge a second output capacitor when one or more predetermined criteria are met. The drive arrangement also comprises a second driver configured to charge the second output capacitor.

The present disclosure relies upon the recognition that the charging rate of output capacitors, in a two-driver driver arrangement, differ depending upon the current provided by the respective drivers to loads that draw power from the output capacitors. The present disclosure proposes to allow a first driver to charge the second output capacitor if the charging rate of the first output capacitor is greater than the charging rate of the second output capacitor by at least some predetermined minimum amount, such that the charging rate/voltage of the two output capacitors can be balanced and so the turn on time of different load is also balanced. Of course, more sophisticated embodiments also allow the second driver to charge the first output capacitor if the charging rate of the second output capacitor is greater than the charging rate of the first output capacitor by at least some (other) predetermined minimum amount.

Embodiments of the invention may be employed in lighting units that make use of separate output capacitors for powering separate lighting modules, e.g. LED lighting modules.

FIG. 1 illustrates a driver arrangement 100 for a lighting unit. FIG. 1 is provided for context in understanding the benefits of the proposed invention.

The driver arrangement 100 comprises a first driver I1 and a first output capacitor C1, wherein the first driver is configured to provide power for charging the first output capacitor.

The driver arrangement 100 also comprises a second driver I2 and a second output capacitor C2, wherein said second driver is controlled independently of the first driver, and is configured to provide power for charging the second output capacitor.

The first I1 and second I2 drivers here each comprise a current source, configured to control a current provided to the loads respectively, thereby also charging the first and second output capacitors during a startup phase. Thus, the first and second drivers control a charging rate of the first and second output capacitors. The operation of the first and second drivers may be controlled by a control unit (not shown).

The driver arrangement 100 forms part of a lighting unit. The lighting unit further comprises a first LED lighting module U1 that draws power from the first output capacitor C1 (but does not form part of the driver arrangement itself). The lighting unit also comprises a second LED lighting module U2 that draws power from the second output capacitor C2 (but does not form part of the driver arrangement itself). Each LED lighting module comprises a string of one or more LEDS, and has a forward voltage, which (for the sake of explanation) is here assumed to be substantially identical. The light output characteristics of each LED lighting module preferably differ (e.g. so that different LED modules provide light of a different color, temperature, spread, angle, spectrum and/or any other suitable light output characteristic). The light outputs of the two LED lighting module are mixed to generate an overall color, etc. to the user. Tuning the ratio of the light outputs can thereby tune the overall light output characteristic as seen by the user so as to achieve tunability which is more and more desired for intelligent controlling of light.

The LED lighting modules may be replaced by other loads (e.g. sensors, communication modules and so on) in various embodiments of the invention. In particular, the LED lighting modules may be replaced by other forms of lighting modules, e.g. halogen lighting modules or the like. For the sake of conciseness, the following explanation will hereafter assume that LED lighting modules act as the loads that draw power from the output capacitors.

The first I1 and second I2 drivers are designed to control or define a (average) current flowing through the first and second LED lighting modules respectively. This is for the purpose of controlling a magnitude of light output by each of the first and second lighting modules, i.e. controlling a light intensity of light output by each of the first and second LED lighting modules. Control of the current is usually performed using a pulse width modulation technique, although other approaches could be used.

The output capacitors act as voltage storage devices, charging until reaching a "terminal voltage" (e.g. a forward voltage of the respective LED lighting module), to provide the high voltage needed to power the LED lighting modules. The terminal voltage is a voltage required to power the LED lighting module (or other load). When the terminal voltage is reached, current begins to flow through the LED lighting module (preventing further charging of the capacitor). The output capacitors, in normal operation, act as buffers for smoothing the current through the LED lighting modules; however, during a startup phase, their charging times to the terminal voltage directly determines when the respective LED lighting modules are turned on or activated.

Figure 2:
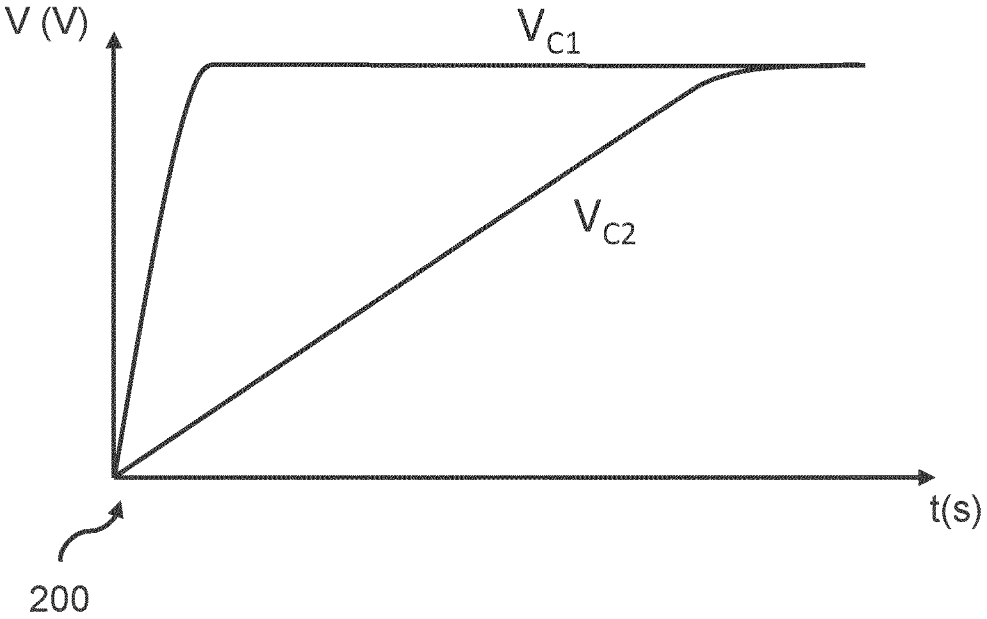
FIG. 2 illustrates voltage waveforms for output capacitors of the driver arrangement.

FIG. 2 is a graph illustrating a voltage V across the first and second output capacitors, of the driver arrangement 100, over time t. A first waveform illustrates the first output capacitor voltage $V_{C1}$ (the voltage across the first output capacitor C1) and a second waveform illustrates the second output capacitor voltage $V_{C2}$ (the voltage across the second output capacitor C2).

Initially, at a time to, the voltage across each output capacitor is 0. This may be the case immediately as the lighting unit is first switched on (e.g. when the output capacitors have been completely discharged due to leakage or purposive discharging through a resistive load (not shown) for improved safety).

During a scenario in which a (average) current supplied to the first output capacitor by the first driver I1 is less than a (average) current supplied to the second output capacitor by the second driver I2, then the second output capacitor voltage increases more slowly than the first output capacitor voltage (i.e. charges more slowly. This scenario may arise if, for example, there is a desire for the second LED lighting module to output light of a lower intensity than the first LED lighting module. As previously explained, driver arrangements control the intensity of light output by an LED lighting module U1, U2 by controlling an average current through the LED lighting module, and thereby the current provided the relevant output capacitor C1, C2. In this situation, the control unit can instruct the first driver and the second driver to output the respective current with differences in the current amplitude.

With the current output from the respective drivers being different, the rate of charging for the different output capacitors is also different, and the LED lighting modules U1, U2 will begin to output light at different times, as the voltage across each output capacitor C1, C2 will reach the forward voltage of the respective LED lighting module U1, U2 at different times. This disadvantageously results in the light output of the lighting unit appearing to change during a start-up process. For example, the lighting unit will output U1's color/characteristic for a while and suddenly changes to the mixed color/characteristic of U1 and U2, and this change can be noticeable and may annoy the user.

The present disclosure recognizes this problem, and proposes an approach to overcome it.

Figure 3:
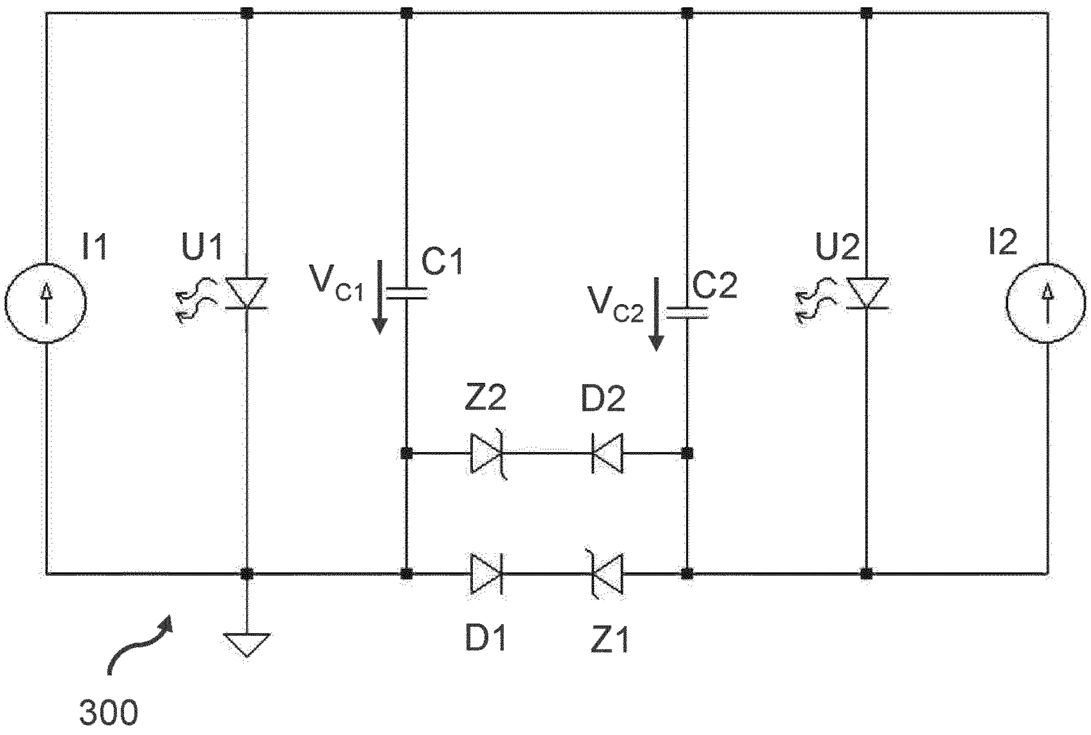
FIG. 3 illustrates a driver arrangement according to an embodiment.

FIG. 3 illustrates a driver arrangement 300 according to an embodiment.

The driver arrangement 300 differs from the driver arrangement 100 of FIG. 1 by further comprising a first electronic path D2, Z2 and a second electronic path D1, Z1. In some simplified embodiments, one of the electronic paths is omitted, for example, in a scenario in which one driver is designed to output current no larger than the other, such as when one driver is an auxiliary driver with a relatively small output rated current and the other is a main driver with a relatively large output rated current.

The first and second electronic paths may share some circuitry, as exemplified in the illustrated example in which a direct connection between the anodes of the first C1 and second C2 output capacitors are shared by the first and second electronic paths.

For the sake of conciseness, the structure and operation of the first electronic path shall be hereafter described. The structure and operation of the second electronic path is similar to the operation of the first electronic path, as later set out.

The first electronic path is coupled (i.e. directly or indirectly connected) between the first driver I1 and the second output capacitor C2. As illustrated, the first electronic path may include circuitry connected between the cathodes of the first C1 and second C2 output capacitors. The first electronic path is configured to allow the first driver, in response to one or more first predetermined criteria being met, to also charge the second output capacitor. Preferably, the driver arrangement comprises a first arrangement to determine whether the one or more first predetermined criteria being met.

In the driver arrangement 300, the one or more first predetermined criteria includes at least a first criterion that the difference between the voltage across the first output capacitor C1 (the "first output capacitor voltage" $V_{C1}$) and the voltage across the second output capacitor (the "second output capacitor voltage" $V_{C2}$), i.e. $V_{C1}-V_{C2}$, reaches or exceeds a predetermined value $V_{PD}$. Thus, the first criterion may be that the first output capacitor voltage $V_{C1}$ is greater than the second output capacitor voltage $V_{C2}$ by at least the predetermined value $V_{PD}$.

In particular examples, the first electronic path, when activated, is configured to allow the first driver I1 to charge the second output capacitor C2 to follow the charging and voltage of the first output capacitor C1.

To achieve this functionality, the first electronic path comprises a voltage trigger arrangement Z2, D2, as the first arrangement, that is adapted to, in response to a difference between the voltage across the first output capacitor C1 and the voltage across the second output capacitor C2 reaching or exceeding the predetermined value (i.e. $V_{C1}-V_{C2}>=V_{PD}$), become conductive and permit/allow the first driver to charge the second output capacitor C2.

Here, the voltage trigger arrangement comprises a Zener diode Z2 and a blocking diode D2 connected in anti-series, i.e. anodes or cathodes connected to one another. The component values of the Zener diode and the blocking diode define the predetermined value. The blocking diode D2 acts to prevent a forward conduction of the Zener diode Z2.

The illustrated voltage trigger arrangement comprises a Zener diode having its anode connected to the cathode of the second output capacitor C2, and its cathode connected to the cathode of the blocking diode D2. The anode of the blocking diode is connected to the cathode of the first output capacitor C1.

Alternatively, the voltage trigger arrangement may be configured so that the cathode of the Zener diode Z2 is connected to the cathode of the second output capacitor C2, with the anode of the Zener diode Z2 being connected to the anode of the blocking diode D2. In this example, the cathode of the blocking diode D2 is connected to the cathode of the first output capacitor C1.

As another example, the voltage trigger arrangement may be configured so that cathode of the Zener diode is connected to the cathode of the first output capacitor, and the anode of the Zener diode is connected to the anode of the blocking diode. In this example, the cathode of the blocking diode is connected to the cathode of the second output capacitor.

As yet another example, the voltage trigger arrangement may be configured so that anode of the Zener diode is connected to the cathode of the first output capacitor, and the cathode of the Zener diode is connected to the cathode of the blocking diode. In this example, the anode of the blocking diode is connected to the cathode of the second output capacitor.

For all configurations of the voltage trigger arrangement, the first electronic path further comprises a direct connection between the anodes of the first C1 and second C2 output capacitors (so that current is able to flow through the Zener diode Z2 and blocking diode D2 to charge the second output capacitor when they are made conductive).

In these configurations, the sum of the (reverse) breakdown voltage of the Zener diode Z2 and the forward voltage of the blocking diode D2 defines the predetermined value $V_{PD}$. In particular, if $V_{C1}-V_{C2}$ reaches or exceeds the predetermined value, the Zener diode Z2 will reverse break down and the blocking diode D2 will become conductive, thereby together becoming conductive to thereby allowing current to flow between the first driver I1 and the second output capacitor C2, which results in the first driver (also) charging, or contributing to the charging of, the second output capacitor. Of course, the first electronic path diverts some current from the first output capacitor to the second output capacitor, thus the time that the first output capacitor is charged to the terminal voltage will be extended a little.

Figure 4:
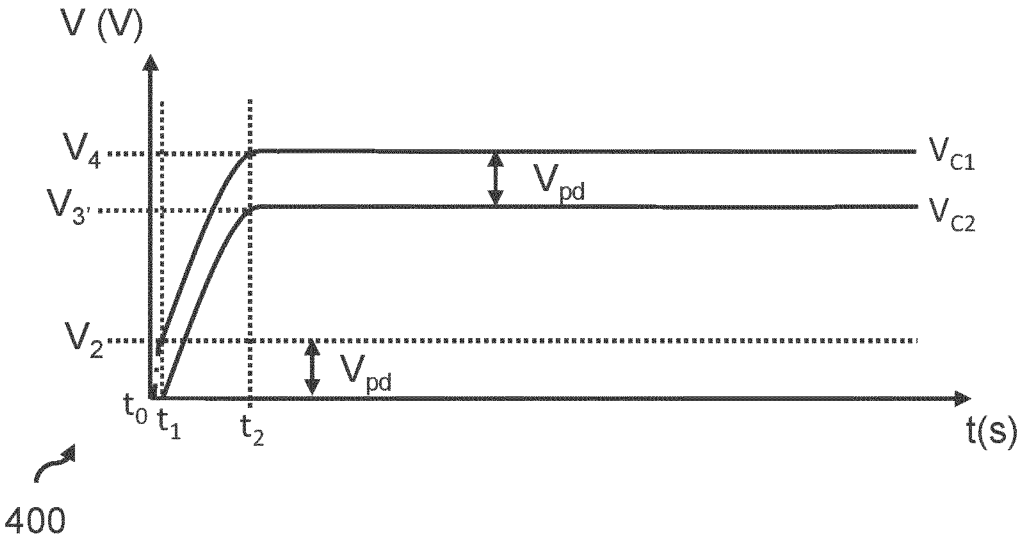
FIG. 4 illustrates voltage waveform for output capacitors of the driver arrangement during a first charging scenario.

This process is illustrated by FIG. 4, which is a graph illustrating a voltage V across the first C1 and second C2 output capacitors, of the driver arrangement 300, over time t during a first charging scenario. A first waveform $V_{C1}$ of FIG. 4 illustrates the first output capacitor voltage $V_{C1}$ and a second waveform illustrates the second output capacitor voltage $V_{C2}$.

In the first charging scenario, the first driver I1 is controlled to charge the first output capacitor C1, and the second driver I2 is controlled to provide no charge to the second output capacitor C2. This means that only the first LED lighting module U1 is controlled to emit light while the second lighting module U1 does not emit light. The first charging scenario begins at an initial time to, when the first output capacitor voltage and the second output capacitor voltage is 0 or negligible (e.g. immediately after the overall lighting unit is switched on).

Initially, only the first output capacitor charges, so that the first output capacitor voltage $V_{C1}$ increases. There is no charge provided to the second output capacitor, so there is no increase in the second output capacitor voltage $V_{C2}$. The charging slope, depicted by the dot-dash line between $t_0$ and $t_1$, of the first output capacitor voltage $V_{C1}$ is relatively steep.

When the difference between the first $V_{C1}$ and second $V_{C2}$ output capacitor voltage reaches the first predetermined voltage $V_{PD}$ at a time $t_1$, the first electronic path begins to allow the first driver to also charge the first output capacitor. For the first charging scenario, time $t_1$ occurs when the first output capacitor voltage reaches a particular voltage level $V_2$ (equal in magnitude to the first predetermined voltage $V_{PD}$). Using the illustrated example of FIG. 3, the Zener diode Z2 breaks down and becomes conductive, thereby allow current to flow. Afterwards, the voltage on the second output capacitor is less than the voltage on the first output capacitor by a clamping voltage which is equal to the predetermined voltage $V_{PD}$. Here, the rate of charge of the second output capacitor C2 matches the rate of charge of the first output capacitor C1. Due to the charging current to the first output capacitor being diverted to the second output capacitor, the charging slope of the first output capacitor, after $t_1$, becomes less steep than that between to and $t_1$.

The first output capacitor C1 is charged by the first driver I1 until the first output capacitor voltage $V_{C1}$ reaches a terminal voltage $V_4$, e.g. at a time $t_2$. The terminal voltage $V_4$ may, for instance, be a forward voltage of a load drawing power from the first output capacitor, i.e. a forward voltage of the first LED module U1.

The second output capacitor C2 is also charged by the first driver I1 and the difference between the first output capacitor voltage $V_{C1}$ and the second output capacitor voltage $V_{C2}$ ($V_{C1}-V_{C2}$) is the predetermined value/clamping voltage $V_{PD}$.

After time $t_3$, the voltage $V_{C1}$ on the first output capacitor is clamped by the first LED module U1 as $V_4$ and will not go higher substantially. the second output capacitor voltage $V_{C2}$ remains at a voltage level $V_3$', which is equal to the terminal voltage $V_4$ of the first output capacitor minus the predetermined value $V_{PD}$. As previously explained, for the circuit illustrated by FIG. 3, the component values of the first electronic path define the magnitude of the predetermined value $V_{PD}$.

The proposed configuration thereby provides a mechanism by which the second output capacitor voltage is maintained at a minimum voltage level $V_3$' if the first output capacitor remains charged, even if no charge is provided to the second output capacitor by the second driver I2.

Preferably, the predetermined value is selected so that the second output capacitor voltage $V_{C1}$, that results from charging by only the first driver (and not the second driver), is less than a forward voltage (or "activation voltage") of the second LED lighting module U2 (or other load replacing the same), e.g. by at least a predetermined margin voltage (e.g. by at least 1V or at least 2V, preferably higher than 10V). Thus, if the second driver provides no charge for charging the second output capacitor (i.e. indicating no desire to activate the second LED lighting module), then the second LED lighting module does not activate or switch on.

In particular, the voltage trigger arrangement Z2, D2 provides a clamping voltage, which is selected such that a voltage across the second output capacitor that results from charging by the first driver alone, and is thereby equal to the voltage across the first output capacitor (C1) minus the clamping voltage, is less than a forward voltage of a load that draws power from the second output capacitor, e.g. by at least a predetermined margin voltage (e.g. by at least 1V or at least 2V).

The use of the proposed approach in these circumstances has the advantage of preventing the second LED lighting module from activating (i.e. emitting light) if the second driver provides no charge to the second output capacitor, whilst also facilitating faster activation of the second LED module U2 if there is a change in desired lighting output by the second LED lighting module, such as a desire to activate the second LED module (as it will take less time to charge the second output capacitor to reach the forward voltage of the second LED module U2).

In some examples, the breakdown voltage of the Zener diode is between 2.7V and 30V. It has been identified that this range provides suitable values for significantly reducing the likelihood (e.g. avoiding the possibility) that the voltage across the second capacitor (resulting solely from charging performed by the first driver) reaches a voltage suitable to power the second LED lighting module for a wide range of possible options for the first and second LED lighting modules.

When both the first and second LED modules have the same forward voltage (e.g. 90V), a breakdown voltage of 15V has been identified as being particularly helpful for preventing the second LED lighting module from activating when a voltage across the first output capacitor reaches the forward voltage. In this situation, since the second capacitor has been pre-charged to a high sufficient level, the second driver, once commanded to turn on the second LED module, can charge the second output capacitor to the terminal voltage and turn on the second LED module relatively quick and so the lighting device is more timely responsive.

Figure 5:
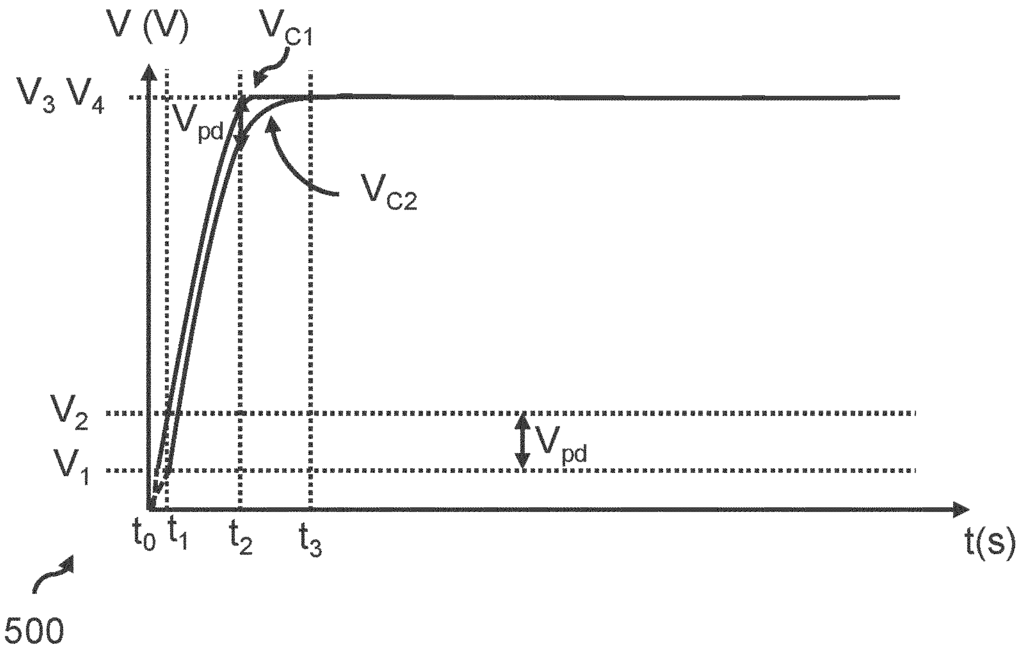
FIG. 5 illustrates voltage waveform for output capacitors of the driver arrangement during a second charging scenario.

FIG. 5 is a graph illustrating a voltage V across the first and second output capacitors, of the driver arrangement 300, over time t during a second charging scenario. As before, a first waveform of FIG. 5 illustrates the first output capacitor voltage $V_{C1}$ and a second waveform illustrates the second output capacitor voltage $V_{C2}$.

In the second charging scenario, both the first and second LED lighting modules are commanded to emit light, so the first driver I1 is controlled to output a corresponding first current and charge the first output capacitor at a first charging rate (e.g. provide a first average current), and the second driver is controlled to output a second corresponding current and charge the second output capacitor at a second, lower charging rate (e.g. provide a second, lower average current). The second charging scenario begins at an initial time to, when the first output capacitor voltage and the second output capacitor voltage is 0 or negligible (e.g. immediately after the overall lighting unit is switched on).

Initially, after time to, both the first output capacitor voltage $V_{C1}$ and the second output capacitor voltage $V_{C2}$ begin to increase. The rate of increase of the first output capacitor voltage $V_{C1}$ is greater than the rate of increase of the second output capacitor voltage $V_{C2}$, as the charging rates of the two output capacitors differ due to the difference in currents provided to the first and second output capacitors. This is shown by the two different dash lines between to and L.

At a time $t_1$, the difference between the first output capacitor voltage $V_{C1}$ and the second output capacitor voltage $V_{C2}$ reaches the predetermined value $V_{PD}$. Thereafter, the first electronic path activates and allows the first driver I1 to contribute to the charging the second output capacitor. The difference between the first output capacitor voltage $V_{C1}$ and the second output capacitor $V_{C2}$ remains at the predetermined value whilst the first driver I1 contributes to the charging of the second output capacitor due to the operation of the Zener diode. Thus, the charging of the second output capacitor effectively follows the charging of the first output capacitor. In this scenario, the charging rate of the first output capacitor C1 reduces (compared to between a time $t_0$ and $t_1$) since some of the output current of the first driver is diverted to charge the second output capacitor C2. This can be seen by the gradient of the slope for the first output capacitor voltage $V_{C1}$ becoming less steep, after time $t_1$, than between to and $t_1$. Similarly, the charging rate of the second output capacitor C2 increases due to the additional current from the first driver, which can be seen by the gradient of the slope for the second output capacitor voltage $V_{C2}$ becoming more steep after time $t_1$, than between to and $t_1$.

At a time $t_2$, the first output capacitor voltage $V_{C1}$ reaches a terminal voltage $V_4$ for the first output capacitor, e.g. a voltage equal to the forward voltage of the first LED lighting module U1. After this point the first output capacitor voltage $V_{C1}$ is clamped by the forward voltage of LED and will not go higher, and the first electronic path is not able to let the first driver contribute to the charging of the second output capacitor, as the difference between the first output capacitor voltage and the second output capacitor voltage falls below the predetermined value (i.e. the Zener diode Z2 become non-conductive). Thereafter, the second driver continues to charge the second output capacitor by itself. This can be seen by that the charging rate of the second output capacitor C2 reducing again.

As a time $t_3$, the second output capacitor voltage $V_{C2}$ finally reaches a terminal voltage $V_3$ (in this embodiment it is the same as $V_4$, but it could also be different from $V_4$) for the second output capacitor C2, e.g. a voltage equal to the forward voltage of the second LED lighting module U2. The time lag between $t_3$ and $t_2$ (i.e. the time difference between fully charging the first output capacitor and fully charging the second output capacitor) is quite short compared with that previously illustrated in FIG. 2.

Thus, both LED lighting modules are activated, and the time taken to activate both LED lighting modules is less than previously possible for driver arrangements.

In particular, by comparing the graph illustrated by FIG. 5 and the graph illustrated by FIG. 3 it can be clearly seen how the speed of charging the second output capacitor, when there is a desire to drive the second LED lighting module with a lower current than that used to drive the first LED lighting module, is substantially increased by employing the approach adopted by the present disclosure.

The proposed approach therefore provides an improved driver arrangement for a lighting unit, which is more responsive to changes in the control of LED lighting modules.

Referring back to FIG. 3, the operation of the second electronic path Z1, D1 is substantially identical to the operation of the first electronic path, to allow the second driver to charge or contribute to the charging of the first output capacitor if one or more second predetermined criteria are met. The driver arrangement comprises a second arrangement to determine whether the one or more second predetermined criteria being met. The second electronic path is for handling a case that the second driver overpowers the first driver (i.e. provides a greater current than the first driver).

In the example of FIG. 3, the one or more second predetermined criteria include a second criterion that the difference between the second output capacitor voltage $V_{C2}$ and the first output capacitor voltage $V_{C1}$ (i.e. $V_{C2}-V_{C1}$) falls below a second predetermined value. Thus, the second criterion may be that the second output capacitor voltage $V_{C2}$ is greater than the second output capacitor voltage $V_{C1}$ by at least a second predetermined value $V_{PD}$. Accordingly, the second arrangement is in response to a difference between the voltage across the second output capacitor C2 and the voltage across the first output capacitor C1 reaching or exceeding the predetermined value (i.e. $V_{C2}-V_{C1}>=V_{PD}$), become conductive and permit/allow the second driver to charge the first output capacitor C2. More specifically, similar as the first arrangement comprising the Zener Z2 and the diode D2, the second arrangement may be formed by a Zener Z2 and a diode D1, wherein $V_{PD}$ equals the sum of the breakdown voltage of Zener Z1 and the forward voltage of diode D1. The second predetermined value may be selected so that the second output capacitor voltage $V_{C2}$, that results from charging by only the second driver (and not the first driver), is less than a forward voltage (or "activation voltage") of the first LED lighting module U1 (or other load replacing the same), e.g. by at least a predetermined margin voltage (e.g. by at least 1V or at least 2V, and preferably no less than 10V). Thus, if the first driver provides no charge for charging the first output capacitor (i.e. indicating no desire to activate the first LED lighting module), then the first LED lighting module does not activate or switch on.

The first and second predetermined values may differ, e.g. depending upon the configuration of the first and second LED modules. For instance, if a forward voltage of the first LED module is greater than a forward voltage of the second LED module, then the first predetermined value may be greater than the second predetermined value, to reduce the likelihood that the charging of the second output capacitor by the first driver causes the second output capacitor voltage to reach the forward voltage of the second LED module.

The operation and structure of the second electronic path is similar to those of the first electronic path previously described, but instead permits the charging of the first output capacitor using the second driver when one or more second predetermined criteria are met. As the structure and operation of the first and second electronic paths are similar, a full description of the second electronic path shall not be provided for the sake of conciseness.

Nonetheless, it is noted that the second electronic path Z1, D1 comprises a second voltage clamping arrangement Z1, D1 connected from the second output capacitor to the first output capacitor, which operates in much the same way as voltage clamping arrangement Z2, D2.

For the sake of completeness, it is noted that an understanding of the structure and operation of the second electronic path (according to an embodiment) can be understood by consulting the previous description of the structure and operation of the first electronic path, whilst replacing the term "first output capacitor" with the term "second output capacitor" (and vice versa), the term "voltage clamping arrangement" with the term "second voltage clamping arrangement", the term "Zener diode" with the term "second Zener diode" and the term "blocking diode" with the term "second blocking diode" where appropriate.

Use of both the first and second electronic paths facilitate improved speed in charging of the first and/or second output capacitor when the current provided by any of the first and second drivers differ.

It is emphasized there could be only one electronic path, instead of two. For example, in a lighting application in which the first driver is definitely rated to overpower the second driver (e.g. always provide a current higher than the second driver), only the first electronic path is needed. Such an application could be that the first LED lighting module is a main light source emitting white light in high or low brightness and the first driver is adapted to output high or low current, and the second LED module is simply an auxiliary light source emitting red/amber to add or not add a bit of warm color to the white color from the first LED module, and the second driver is adapted to output low or even no current.

Figure 6:
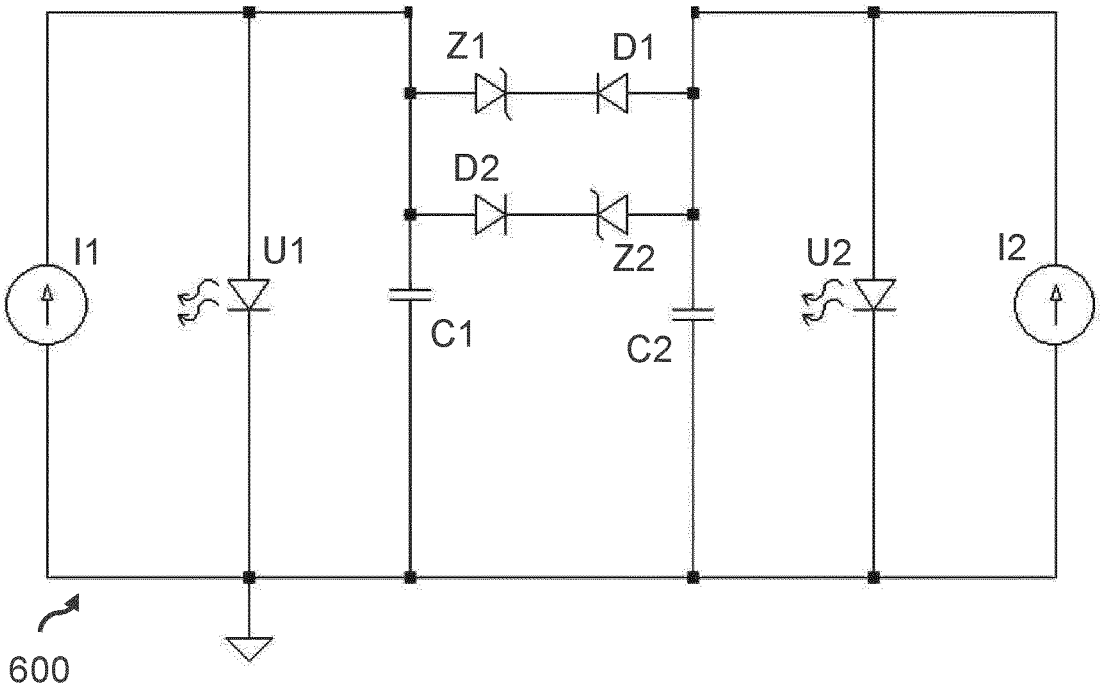
FIG. 6 illustrates a driver arrangement according to another embodiment.

FIG. 6 illustrates an alternative configuration for the driver arrangement 600. The driver arrangement 600 differs from the driver arrangement 300 of FIG. 3 in that the voltage clamping arrangement Z2, D2 and the second voltage clamping arrangement Z1, D1 are connected between the anodes of the first and second output capacitors, rather than the cathodes of the first and second output capacitors. In this configuration, the cathodes of the first and second output capacitors are directly connected together.

The effective operation of the alternative configuration for the driver arrangement 600 is substantially identical to the operation of the driver arrangement 300, as would be apparent to the skilled person, and is not hereafter repeated for the sake of conciseness.

Figure 7:
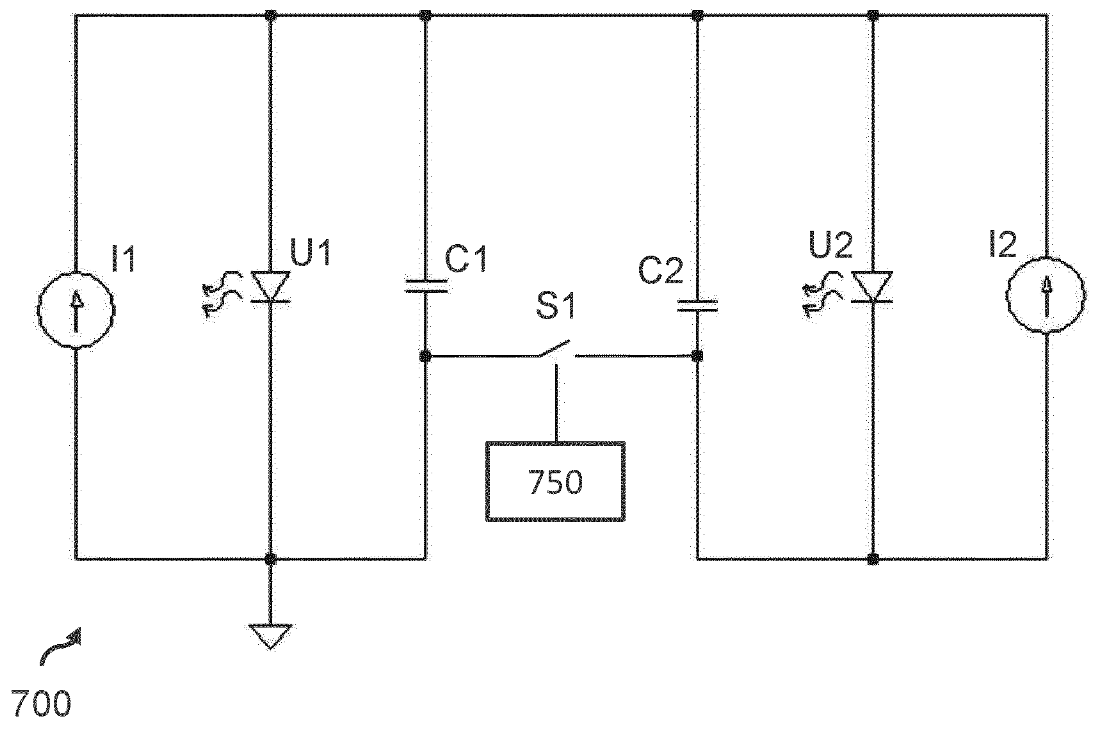
FIG. 7 illustrates a driver arrangement according to yet another embodiment.

In the above embodiments, the charging of one output capacitor of one driver from another driver is triggered by the voltage difference between the two output capacitors. This is not the only way of activating the charging. The charging can be activated by other first predetermined criteria relating to unbalanced output from the respective driver to the respective output capacitor. FIG. 7 illustrates a driver arrangement 700 according to another embodiment.

The driver arrangement 700 from the driver arrangement 100 of FIG. 1 by comprising an electronic path coupled (i.e. directly or indirectly connected) between the first driver I1 and the second output capacitor C2. The first electronic path is configured to allow the first driver I1, in response to one or more first predetermined criteria being met, to also charge the second output capacitor.

Here, the first electronic path comprises a controlled switch S1 controlled by a switch controller 750. The controlled switch S1 is configured to selectively and controllably allow current to flow to the second output capacitor to allow the first driver I1 to charge the second output capacitor.

The illustrated controlled switch is connected between the cathodes of the first and second output capacitor, with the anodes being directly connected. In other examples, the controlled switch may be connected between the anodes of the first and second output capacitors, with the cathodes being directly connected.

The switch controller 750 is configured to control the controlled switch S1 to become conductive in response to the one or more first predetermined criteria being met.

The one or more first predetermined criterion may include a certain criterion that the difference between an (average) output current of the first driver I1 and an (average) output current of the second driver I2 reaches or exceeds a predetermined value. Information on the current may be obtained by directly measuring the current of the drivers, or by receiving one or more signals from a controller of the driver, or a controller of each driver, that indicates an intended current output of (each) driver. Preferably, the driver arrangement comprises a first arrangement to determine whether the first predetermined criterion being met. More specifically, the first arrangement has

- a detecting circuit to detect an (average) output current of the first driver I1 and an (average) output current of the second driver I2, by measuring the output currents directly, or communicate and inquire with respective drivers to know their respective output currents;
- a comparing circuit to compare the two outputs and obtain the difference therebetween; and
- a determining circuit to determine whether the difference exceeds a predetermined value, also by means of comparing the difference with the predetermined value.

This approach effectively causes the first driver to contribute to the charging of the second output capacitor when the charging rate of the first and second output capacitors (from the first and second drivers respectively) differ by more than a predetermined amount. This has the same effect as the voltage controlled approach previously described.

Of course, the one or more predetermined criterion may also/otherwise include the previously described first criterion that the difference between the voltage across the first output capacitor C1 and the voltage across the second output capacitor C2 reaches or exceeds a predetermined value. Other suitable examples for criteria would be apparent to the skilled person, for instance, a criteria that a rate of charging of the first output capacitor is more than a predetermined amount greater than a rate of charging of the second output capacitor.

Preferably, the controlled switch S1 is configured to have a voltage drop across the switch (e.g. is configured to have suitable resistive characteristics) such that the voltage across the second output capacitor, that results from charging the second output capacitor using only the first driver, is less than a voltage required to power the load U2 that draws power from the second output capacitor. In particular, where the load U2 is a LED lighting module, the voltage drop across the switch may be configured such that the voltage across the second output capacitor, that results from charging the second output capacitor using only the first driver, is less than a forward voltage of the LED lighting module U2.

The controlled switch S1 may be adapted to become non-conductive in response to the voltage across the first output capacitor and the voltage across the second output capacitor becoming sufficient to power respective loads that draw power therefrom. This approach can avoid or reduce cross-channel interference between the two output capacitors.

In some examples, the controlled switch is a unidirectional switch, such that the second driver is unable to charge the first output capacitor.

In other examples, the controlled switch is a bidirectional switch, such that the second driver is able to charge the first output capacitor when certain criteria (or a certain criterion) is met. Of course, a bidirectional switch can be replaced by two unidirectional switches, if appropriate. The operation of charging the first output capacitor using the second driver may be substantially the same as the operation for charging the second output capacitor using the first driver (as previously described), and is omitted for the sake of conciseness.

Thus, the controlled switch S1 and the switch controller 750 may be configured to permit the second driver to charge the first output capacitor in response to one or more second predetermined criteria being met. The second predetermined criteria may include one or more of: a criterion that the charging rate of the second output capacitor is greater than a charging rate of the first output capacitor by at least a predetermined amount; a voltage across the second output capacitor is greater than a voltage across the first output capacitor by at least a predetermined amount; and/or a current provided by the second driver to the second output capacitor is greater than the current provided by the first driver to the first output capacitor by at least a predetermined amount.

In other examples, the controlled switch is a unidirectional switch such that the first driver is unable to charge the second output capacitor.

Whilst embodiments have only been disclosed in the context of a driver arrangement having two output capacitors (respectively charged by two different drivers), further embodiments may employ three or more output capacitors (respectively charged by three different drivers).

Thus, for instance, a driver arrangement may comprise a third electronic path between a first driver and a third output capacitor, wherein the third electronic path is configured so that to allow the first driver, in response to one or more third predetermined criteria being met, to also charge the third output capacitor. Here, the third predetermined criteria may include any criteria that indicates a charging rate of the third output capacitor (e.g. by the third driver) is less than a charging rate of the first output capacitor by more than a predetermined amount, or any criteria that indicates that the third driver is charging the third output capacitor below a target charging rate.

For instance, the third predetermined criteria may include one or more of: a criterion that the charging rate of the first output capacitor is greater than a charging rate of the third output capacitor by at least a predetermined amount; a voltage across the first output capacitor is greater than a voltage across the third output capacitor by at least a predetermined amount; and/or a current provided by the first driver to the first output capacitor is greater than the current provided by the third driver to the third output capacitor by at least a predetermined amount. Other suitable criteria will be apparent to the skilled person.

Embodiments envisage that additional electronic paths may be connected between different drivers and different output capacitors depending upon the implementation requirements.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage. If the term "adapted to" is used in the claims or description, it is noted the term "adapted to" is intended to be equivalent to the term "configured to". Any reference signs in the claims should not be construed as limiting the scope.

The invention claimed is:

1. A driver arrangement comprising:

a first driver and a first output capacitor wherein the first driver is configured to provide power for charging the first output capacitor;

a second driver and a second output capacitor wherein said second driver is configured to provide power for charging the second output capacitor; and a control unit configured to control an operation of the first driver and to control an operation of the second driver independently of the first driver;

wherein the driver arrangement further comprises:

a first electronic path coupled between the first driver and the second output capacitor wherein the first electronic path is configured to allow the first driver in response to one or more first predetermined criteria being met, to also charge the second output capacitor.

2. The driver arrangement of claim 1, comprising a first arrangement to determine whether the one or more first predetermined criteria is being met.

3. The driver arrangement of claim 1, wherein the one or more first predetermined criteria includes a first criterion that the difference between the voltage across the first output capacitor and the voltage across the second output capacitor reaches or exceeds a first predetermined value, and the first electronic path is configured to allow the first driver to charge the second output capacitor such that the charging and voltage of the second output capacitor follow the charging and voltage of the first output capacitor, wherein the first electronic path comprises a voltage trigger arrangement connected between the first output capacitor and the second output capacitor, wherein the voltage trigger arrangement is adapted to, in response to a difference between the voltage across the first output capacitor and the voltage across the second output capacitor reaching or exceeding the first predetermined value, become conductive and permit the first driver to charge the second output capacitor.

4. The driver arrangement of claim 3, wherein the voltage trigger arrangement is also adapted to provide a clamping voltage, which is selected such that a voltage across the second output capacitor that results from charging by the first driver and is thereby equal to the voltage across the first output capacitor minus the clamping voltage, is less than a forward voltage of a second load that draws power from the second output capacitor.

5. The driver arrangement of claim 4, wherein the voltage trigger arrangement comprises:

a Zener diode with a reverse break down voltage of between 2.7V to 15V and connected from the first output capacitor to the second output capacitor, the Zener diode being adapted to use the reverse break down voltage as the clamping voltage, and a block diode connected from the second output capacitor to the first output capacitor to prevent a forward conduction of the Zener diode.

6. The driver arrangement of claim 5, wherein the voltage trigger arrangement is adapted to become non-conductive in response to the voltage across the first output capacitor becoming sufficient to power respective a first load that draws power therefrom.

7. The driver arrangement of claim 1, wherein the first electronic path comprises circuitry connected between the cathodes of the first and second output capacitors, with the anodes of the first and second output capacitors being directly connected; or the first electronic path comprises circuitry connected between the anodes of the first and second output capacitors, with the cathodes of the first and second output capacitors being directly connected.

8. The driver arrangement of claim 1, further comprising:

a second electronic path coupled between the second driver and the first output capacitor, wherein the second electronic path is configured to allow the second driver, in response to one or more second predetermined criteria being met, to also charge the first output capacitor.

9. The driver arrangement of claim 8, comprising a second arrangement to determine whether the second predetermined criteria being met, wherein the one or more second predetermined criteria includes a second criterion that the difference between the voltage across the second output capacitor and the voltage across the first output capacitor reaches or exceeds a second predetermined value.

10. The driver arrangement of claim 9, wherein the second electronic path comprises circuitry connected between the cathodes of the first and second output capacitors, with the anodes of the first and second output capacitors being directly connected; or the second electronic path comprises circuitry connected between the anodes of the first and second output capacitors, with the cathodes of the first and second output capacitors being directly connected, and the second electronic path comprises a voltage trigger arrangement connected between the second output capacitor and the first output capacitor, wherein the voltage trigger arrangement is adapted to, in response to a difference between the voltage across the second output capacitor and the voltage across the first output capacitor reaching or exceeding the second predetermined value, become conductive and permit the second driver to charge the first output capacitor.

11. The driver arrangement of claim 2, wherein the one or more first predetermined criteria includes a certain criterion that the difference between an output current of the first driver and an output current of the second driver reaches or exceeds a predetermined value, the driver arrangement comprises a switch controller, and the first electronic path comprises a controlled switch to allow a current from the first driver to also charge the second output capacitor, wherein the controlled switch is operated by the switch controller in a linear state and wherein a voltage drop across the controlled switch is selected such that the voltage across the second output capacitor that results from charging by the first driver and is thereby equal to the voltage across the first output capacitor minus the voltage drop across the controlled switch, is less than a forward voltage of a second load that draws power from the second output capacitor; and the controlled switch is operated by the switch controller to become non-conductive in response to the voltage across the first output capacitor and the voltage across the second output capacitor becoming sufficient to power respective loads that draw power therefrom.

12. The driver arrangement of claim 1, wherein the first driver comprises a first current source configured to supply a current through a first output connected to the first output capacitor, and the second driver comprises a second current source configured to supply a current a second output connected to the second output capacitor.

13. A lighting unit comprising:

the driver arrangement of claim 1;

a first lighting module, as a first load; configured to draw power from the first output capacitor, wherein the current through the first lighting module is controlled by the first driver; and a second, different lighting module, as a second load, configured to draw power from the second output capacitor, wherein the current through the second lighting module is controlled by the second driver.

14. The lighting unit of claim 13, wherein the first lighting module comprises one or more LEDs, and the second lighting module comprises one or more LEDs.

15. The lighting unit of claim 13, wherein the control unit configured to control the operation of the first driver and the second driver using a pulse width modulation control technique.

* * * * *